Oct. 28, 1958　　　R. M. THOMAS ET AL　　　2,858,345
GLYCEROL PRODUCTION
Filed March 30, 1956
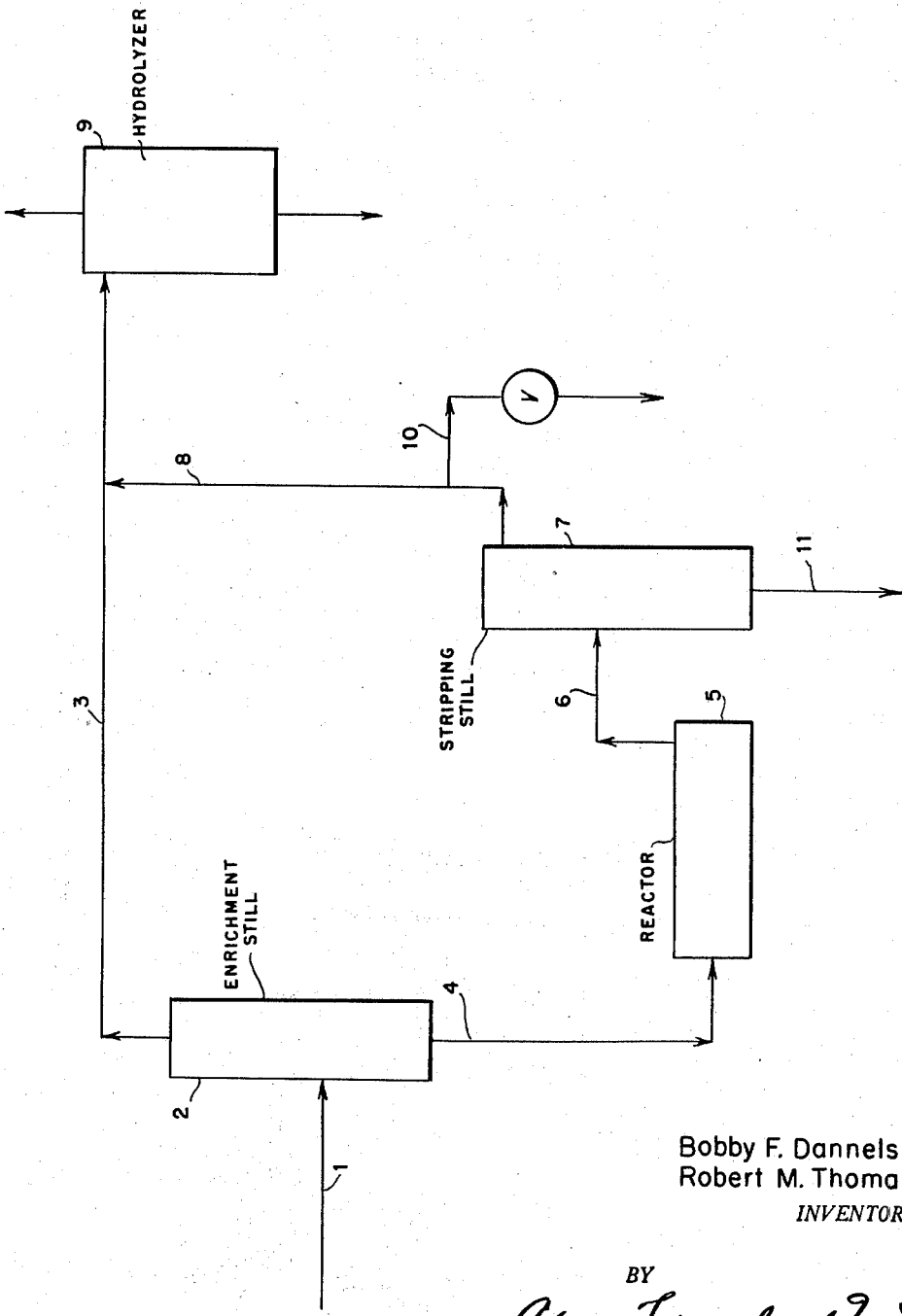
Bobby F. Dannels
Robert M. Thomas
*INVENTORS*
BY
*Adams, Forward and McLean*
ATTORNEYS 2,858,345
Patented Oct. 28, 1958

2,858,345

GLYCEROL PRODUCTION

Robert M. Thomas, Niagara Falls, and Bobby F. Dannels, Tonawanda, N. Y., assignors to Olin Mathieson Chemical Corporation, a corporation of Virginia Application March 30, 1956, Serial No. 575,009

2 Claims. (Cl. 260—636)

This invention relates to the manufacture of glycerol by hydrolysis of an aqueous solution of the glycerol dichlorhydrin isomers 1,2-dichloro-3-hydroxy propane and 1,3-dichloro-2-hydroxy propane (hereinafter referred to as DCH).

It is well known that DCH can readily be obtained in dilute aqueous solutions by the addition of hypochlorous acid to allyl chloride and that such solutions can be hydrolyzed to glycerol. In the chlorohydrination of allyl chloride, it has been shown that the desired reaction occurs in the aqueous phase; reactions in the organic phase form water-insoluble by-products. Due to the low water solubility of allyl chloride, it is advantageous therefore to work with dilute solutions. Despite all precautions, such as the use of dilute solutions and the removal of any organic phase which is formed, by-product reactions occur with the formation of, for example, chloroethers. This problem becomes increasingly serious as the concentration of DCH in the reaction product increases. The DCH yield drops off rapidly with increasing concentration. It has been found that for the formation of DCH in optimum yields it is necessary to restrict the final DCH concentration to below 5 weight percent, preferably to 4.6 weight percent.

Glycerol can be obtained from the dilute DCH solutions by a number of methods. Thus, the DCH solutions from the chlorohydrination reaction, containing about one mole of HCl per mole of DCH, can be reacted with 20–50 weight percent aqueous caustic solutions to give glycerol in 95–96 percent yields. However, when starting with a 4.6 percent DCH solution the final aqueous hydrolysis product contains only about 3.2 weight percent glycerol and 6.9 weight percent sodium chloride. In addition, impurities from the chlorohydrination are present. Because of these impurities, as well as the problem of isolating glycerol from such dilute solutions in the presence of large amounts of salt, it is difficult to recover a pure glycerol. Also because of the large evaporation and equipment requirements the production costs are high.

A second method for producing glycerol from DCH solutions involves its conversion to epichlorohydrin; the epichlorohydrin is diluted with water and hydrolyzed with caustic to yield glycerol. This process has the advantages that two thirds of the chlorine is removed prior to glycerol formation and the final glycerol concentration is not dependent upon the concentration restrictions imposed by the chlorohydrination reaction. It has the disadvantage of material loss in the conversion of DCH to epichlorohydrin.

A third process, described in U. S. 2,605,293, combines the methods just described to minimize the loss of glycerol yield in going through epichlorohydrin and still to retain the advantages of obtaining increased glycerol concentrations at increased ratios of glycerol to salt. This is done by converting a portion of the DCH solution to epichlorohydrin and using this epichlorohydrin to fortify the residual DCH solution. It has the disadvantage of leaving in the final glycerol solution a portion of the impurities formed in the chlorohydrination as well as an appreciable amount of salt formed by neutralization of the HCl present in the DCH solution.

It is a general object of the present invention to provide an improved method for synthesizing glycerol from aqueous DCH solutions obtained by the chlorination of allyl chloride. Another object is to provide a method for removing impurities which are present in the chlorohydrination product. A further object is to provide a process for producing a concentrated glycerol solution from hydrolysis of DCH in which the ratio of sodium chloride to glycerol is markedly decreased over that which can be obtained by any process previously described. A third object of the invention is to provide a process for producing a glycerol solution from which a pure grade of glycerol can be recovered by well known procedures. Other objects of this invention will be apparent from the descriptions which follow.

In accordance with this invention the crude product resulting from the reaction of chlorine water and allyl chloride is fed to an enrichment still. From the top there is recovered preferably 5–15 weight percent aqueous DCH. This enrichment is possible since DCH and water will form an azeotrope at 99° C., at atmospheric pressure, comprising 23 percent DCH by weight. Substantially all of the HCl in the original feed and the remainder of DCH flow, in dilute aqueous solution, from the bottom of the still. This bottom portion is treated with an alkali such as caustic soda or lime whereby the DCH is converted to epichlorohydrin and the HCl is neutralized. The epichlorohydrin is then stripped off in a stripping still and is fed into the overhead from the first still. The combined DCH and epichlorohydrin can then be hydrolyzed to glycerol in the usual manner, i. e. with caustic. From the bottom of the stripping still there is obtained a solution of salt and water which is removed from the process.

In this manner there is obtained an improved feed stream for the hydrolyzer which contains little or no HCl. Since all of the latter can be neutralized with inexpensive lime in our process, a lower raw material cost is realized than would otherwise exist if any HCl were fed to the hydrolyzer unit, as it is necessary to perform the final hydrolysis with sodium hydroxide. The glycerol resulting from the hydrolysis of this stream is more pure and has better color than that which is obtained by the hydrolysis of streams containing HCl and other impurities such as are present in crude DCH solutions.

Further advantages over prior processes are realized in the glycerol recovery step. Since the first distillation of this process removes as bottoms most of the water and all of the HCl (the latter is tied up as the 20 percent HCl–80 percent $H_2O$ azeotrope which has a boiling point of 109° C.) there is less salt formed in the hydrolyzer by this process than by those processes wherein the hydrolyzer feed contains HCl. Simpler recovery of glycerol from the glycerol-salt slurry is thus attained, since there is less salt to adsorb the product.

In the preferred embodiment of this invention, a DCH concentration in the vicinity of 6–14 percent is removed overhead from the first distillation column, while the bottoms contain the remainder of this material. It is possible to recover an 85 percent DCH solution in this step, by distilling over the 23 percent DCH azeotrope and cooling it to about room temperature. The solubilities of $H_2O$ in DCH, and vice versa, are about 15 percent at room temperature, so the azeotropic cut will separate into two phases, the DCH phase having a concentration of 85 percent. However, since the final glycerol concentration in the hydrolyzer should not exceed about 12–14 percent, or the problem of glycerol polymerization during water evaporation is faced, a DCH feed stream of high concentration offers no advantage.

The above consideration also applies to the epichlorohydrin stripper, where we prefer to remove the azeotrope boiling at 88° C. and containing 75 percent epichlorohydrin. Upon cooling the latter to about room temperature a phase separation will take place. The heavier of the two phases contains about 98 percent epichlorohydrin. This concentrated phase can then be separated and fed to the overhead from the first still to give a mixture which hydrolyzes nicely when treated with aqueous caustic.

In general, almost any proportion of the DCH in the crude feed stream can be withdrawn from the bottom of the first still. As greater volumes are tapped off here, the final salt in the glycerol hydrolyzer decreases, since the conversion to epichlorohydrin accounts for one-half of the hydrolysis. We have found that at least 30 percent of the total DCH is preferably taken in this manner. The upper limit for this value is dictated by the particular design of the apparatus and by the fact that there is some glycerol formed in the hydrolysis to epichlorohydrin. It is equally uneconomical to recover such glycerol from the large volume of salt water as to discard it. We have found that the economy decreases if more than about 85 percent of the DCH is withdrawn from the bottom of the first still.

The following examples further illustrate the invention, and should be considered in conjunction with the drawing.

*Example I*

An aqueous solution containing approximately 3.3 percent by weight of DCH isomers, 1 percent HCl, and the balance water and a small amount of organic impurities was prepared by feeding allyl chloride and a dilute solution of chlorine and water continuously to a reactor in proportions of approximately 35 volumes of water for each volume of allyl chloride. Equimolar amounts of chlorine were used with respect to the allyl chloride. Under these conditions conversion of the allyl chloride to the DCH is approximately 93 percent.

A portion of this solution containing 2.8 moles of DCH was fed, by means of line 1 in the drawing, to an enrichment still or continuous fractionating column 2. The overhead fraction from this column contained 1.94 moles of DCH isomers as an 8.67 percent aqueous mixture by weight. The bottoms from the fractionating tower contained all of the HCl and the remaining DCH isomers. It was fed by means of line 4 to a reactor 5 where it was treated with an aqueous lime slurry containing 4.0 moles of $Ca(OH)_2$ at a 15 weight percent concentration at 80 to 90° C. during a residence time of 4 minutes. It was then fed by means of line 6 to an 18 plate steam stripping still or column 7 where 0.87 mole of epichlorohydrin in admixture with 0.09 mole of water was recovered overhead by means of line 8 and combined with the DCH mixture from still 2 in line 3. All of the salt formed, in dilute aqueous solution, flowed out of line 11 and was discarded. The solution in line 3 was then charged to the hydrolyzer 9. Hydrolysis of this solution with the theoretical amount of a 20 percent by weight aqueous sodium hydroxide solution containing 4.75 moles of NaOH gave a final glycerol solution containing approximately 6.2 percent glycerine and 7.1 percent sodium chloride by weight. The yield of glycerol based on DCH was 94.5 percent of the theory.

*Example II*

A water solution comprising 40 moles of DCH isomers were prepared by the hypochlorination of allyl chloride and contained 4.3 percent DCH and 1.25 percent HCl by weight. The solution was fed by means of line 1, in the drawing, to the still 2. By means of line 3, 60 percent of the DCH isomers present in the original solution was taken overhead as a 10.3 percent weight aqueous mixture. The bottoms from the fractionation contained the residual DCH and all of the HCl and was hydrolyzed with 29.4 moles of $Ca(OH)_2$ in the form of a 15 percent aqueous mixture in the reactor 5. Reaction products were then steam stripped in stripper 7 to recover 14.7 moles of epichlorohydrin mixed with 1.5 moles of water. This was fed by means of line 8 to line 3 where it was combined with the DCH mixture leaving the head of the fractionating column 2. This combined solution was led to the hydrolyzer 9 where it was hydrolyzed with 20 percent aqueous caustic solution after buffering with a small amount of sodium carbonate. This gave a final glycerol mixture containing approximately 7.4 percent glycerol and 8.3 percent sodium chloride.

*Example III*

25 pound moles of DCH present as a 4 percent solution obtained from the hypochlorination of allyl chloride was fed by means of line 1 to a continuous fractionating column 2 of the drawing. Forty (40) percent of the DCH was taken overhead as a 14 weight percent aqueous mixture. All of the HCl present in the original hypochlorination product and the residual 15 pound moles of DCH were removed as bottoms from the fractionating tower by means of line 4 and led to the reactor 5 where they were treated with a lime slurry containing 21.4 pound moles of $Ca(OH)_2$ at a concentration of 20 weight percent at 90 to 100° C. The reaction products from reactor 5 were led by means of line 6 to the steam stripping column 7. 13.8 pound moles of epichlorohydrin in admixture with 1.5 pound moles of water emerged from the head of this still. 5 pound moles of this epichlorohydrin was added to the 14 percent DCH mixture in line 3 by means of line 8, while the remainder was tapped and collected by means of line 10. The mixture in line 3 was sent to the hydrolyzer 9, and was hydrolyzed with 15 percent aqueous sodium hydroxide solution after being buffered with sodium carbonate. This gave a final glycerol reaction product containing 7.8 percent glycerol and 8.9 percent sodium chloride.

We claim:

1. In a process wherein a dilute aqueous solution of dichlorohydrin isomers containing hydrogen chloride as an impurity is hydrolyzed to glycerol, the steps of fractionally distilling said aqueous solution in an enrichment still to provide an aqueous overhead fraction containing from 6 to 14 percent by weight of dichlorohydrin isomers and an aqueous bottom fraction of reduced dichlorohydrin content but of enriched hydrogen chloride content, reacting said bottom fraction with an alkali to convert the dichlorohydrin isomers present therein to epichlorohydrin and to neutralize the hydrogen chloride, thereafter distilling said bottom fraction in a stripping still and removing epichlorohydrin overhead, admixing overhead from the enrichment still and the stripping still, and hydrolyzing the dichlorohydrin isomers and epichlorohydrin present therein to glycerol.

2. The method of claim 1 wherein said alkali is calcium hydroxide.

References Cited in the file of this patent

UNITED STATES PATENTS 2,605,293     Tymstra              July 29, 1952

OTHER REFERENCES

Miner et al.: "Glycerol," Reinhold, N. Y., 1953; pp. 354–6, 370.